(12) United States Patent
Bouru et al.

(10) Patent No.: US 7,753,612 B2
(45) Date of Patent: Jul. 13, 2010

(54) SWIVELING DEVICE FOR A BELL CRANK FORK

(75) Inventors: Michel André Bouru, Montereau sur le Jard (FR); Gérard Joël Patrick Etoile, Nemours (FR)

(73) Assignee: SNECMA, Paris (FR)

( * ) Notice: Subject to any disclaimer, the term of this patent is extended or adjusted under 35 U.S.C. 154(b) by 111 days.

(21) Appl. No.: 11/871,667

(22) Filed: Oct. 12, 2007

(65) Prior Publication Data

US 2008/0260456 A1 Oct. 23, 2008

(30) Foreign Application Priority Data

Oct. 13, 2006 (FR) .................................. 06 54275

(51) Int. Cl.
*F16C 11/06* (2006.01)
(52) U.S. Cl. .................... 403/158; 403/79; 403/123; 403/131; 403/154
(58) Field of Classification Search .............. 403/79, 403/123, 128, 131, 150, 154, 157, 158
See application file for complete search history.

(56) References Cited

U.S. PATENT DOCUMENTS

| | | | |
|---|---|---|---|
| 679,889 A | * | 8/1901 | Dorn .......................... 403/157 |
| 2,728,975 A | | 1/1956 | Potter |
| 3,198,563 A | | 8/1965 | Steidl |
| 3,441,299 A | * | 4/1969 | Pfaar .......................... 403/131 |
| 4,174,137 A | | 11/1979 | Ferris |
| 4,190,378 A | * | 2/1980 | Stecklein ..................... 403/146 |
| 4,491,436 A | * | 1/1985 | Easton ......................... 403/131 |
| 5,251,986 A | * | 10/1993 | Arena ......................... 384/272 |
| 5,501,421 A | | 3/1996 | Klüting |
| 6,068,275 A | * | 5/2000 | Chino ................... 280/124.112 |

FOREIGN PATENT DOCUMENTS

FR 2.005.524 12/1969

* cited by examiner

*Primary Examiner*—Michael P Ferguson
(74) *Attorney, Agent, or Firm*—Oblon, Spivak, McClelland, Maier & Neustadt, L.L.P.

(57) ABSTRACT

The assembly comprises a fixed fork (10) of which the lugs (22, 30) support a rod (60) onto which a spherical ball is slipped (46) about which a cage (44) and a support (42), of the part which is mobile in rotation, swivel. The maintaining of the axial and angular positions of the spherical ball (46) in the fork is ensured, in particular, by a tight fit (A3) which replaces conventional screw and nut systems positioned at the end of the rod and which project disadvantageously.

According to the invention, a pair of planar facets which are opposing and in abutment (including 23) carry out a blocking of one of the assembly pieces in rotation.

Application to bell cranks for the transmission of movement, in particular in aircraft engines.

8 Claims, 12 Drawing Sheets

SWIVELING DEVICE FOR A BELL CRANK FORK

TECHNICAL FIELD

The present invention relates to the field of assemblies of devices swiveling on bell crank forks.

It relates to an assembly of a device swiveling on a bell crank fork.

It also relates to a control system for a variable pitch flow-straightener comprising such an assembly of a device swiveling on a bell crank fork.

It finally relates to an aircraft engine provided with at least one such assembly of a device swiveling on a bell crank fork.

PRIOR ART

The assembly of a device swiveling on a bell crank fork is known, for example in the document U.S. Pat. No. 4,174,137. In the known manner, the bell crank fork comprises two parallel lugs, each penetrated by a bore aligned with the bore of the other lug. In a similarly known manner, the swiveling device comprises a spherical internal ring, or ball joint ball, penetrated by a ring bore, which is surrounded by an external ring of spherical shape corresponding to the ball or ball joint cage, itself carried by a support. The support is thus mobile in all rotational directions, or "swiveling", relative to the fork.

Said document reveals a conventional assembly of the device swiveling on the bell crank fork, in which the internal ring is tightened between the two lugs of the fork by means of a screw-nut coupling. The rod of the screw successively passes through the bore of one of the lugs of the fork, then the bore of the ring, then the bore of the other lug of the fork and the nut is tightened onto the end of the screw, which is threaded to this end. The size of such an assembly is large in the axial direction of the screw. More specifically, the height of the head of the screw and the height of the nut are added to the size of the fork in this direction.

In some specific configurations, the space available to house an assembly of this type is reduced. More specifically, as is the case, for example, for control systems for variable pitch flow-straighteners of a turbomachine compressor, the assembly of the swiveling device on the bell crank fork is inserted into a volume of reduced width, in the order of several centimeters.

The diameter of the spherical ball is generally dictated by the application and, in particular, by the forces which it has to undergo. The lugs of the fork between which the ball is mounted, have to be at a distance allowing sufficient angular clearance of the swiveling support. The ends of the ball and the nut add to the transverse spatial requirement of the device, which may become excessive within small housings.

The need, therefore, exists to propose an assembly of a device swiveling on a bell crank fork which may be implemented with a restricted spatial requirement.

U.S. Pat. No. 5 5 501 421, FR-A-2 005 524 and U.S. Pat. No. 2,728,975 illustrate designs which are quite close to the invention.

DESCRIPTION OF THE INVENTION

A first object of the invention is to propose an assembly of a device swiveling on a bell crank fork which may be implemented with a restricted spatial requirement. This is the case, for example, for assemblies of devices swiveling on bell crank forks which are implemented in the control systems for variable pitch flow-straighteners of a turbomachine compressor.

A second object of the present invention is to propose an assembly of the device swiveling on a bell crank fork which respects certain restrictions of assembly. The spherical ball thus has to remain fixed. However, in order to avoid seizing, it is not desirable that it is forcibly mounted on the rod passing through the fork. This is why it is mounted by a close sliding fit on the rod and maintained in place by tightening the parts in the direction of the axis of the rod, which is carried out by the nut.

The elimination of the nut has to be made by maintaining the spherical ball in position against the rotational and axial movements. It is also noteworthy that the jamming of the spherical ball between the two lugs of the fork is not a perfect solution, since it also requires strict manufacturing tolerances and may also lead to deformations which are detrimental to the service life of the bell crank.

The type of invention relates to an assembly of a device swiveling on a bell crank fork by assembly means, said assembly means comprising an assembly rod and other assembly means, in which said swiveling device comprises an internal ring (the spherical ball) penetrated by a ring bore, in which said bell crank fork comprises two lugs each penetrated by one respective lug bore, said lug bores being aligned with one another according to an assembly axis, and in which said assembly rod passes successively through one of the lug bores, then the ring bore, then the other lug bore, where said other assembly means have a tight fit of one portion of the rod on a surface in which said portion is engaged.

A tight fit is relied upon to replace the screw and nut system, generally combined with other assembly means to guarantee the immobilization of the spherical ball or internal ring in rotation and in translation along the rod. By stopping the rod passing through the fork by a tight fit generally located via the lug bores, the end of the screw where the threaded portion was made and which had to project beyond the fork to receive the nut becomes unnecessary.

The surface which provides the tight fit with the portion of the rod may belong to a bushing engaged in one of the lug bores of the fork. Such a bushing often has the advantage of contributing to the retention of the internal ring in the axial portion.

The rod portion having a tight fit will often oppose a head of the rod resting on an external face of one of the two lugs of the fork and forming part of the other assembly means, more precisely defining an abutment of the rod.

The tight fit constitutes a means for blocking the rod in translation as well as in rotation. Further assembly means also have to be added to retain the internal ring. These means may be located on the additional parts, which also have to be held in translation and in rotation and which are of different types, as will be seen according to the disclosed examples. These assembly means may thus comprise a bushing engaged in one of the lug bores of the fork around the rod and comprising an end face bearing against the external ring; or two bushings of this type, which are thus engaged in each of the lug bores of the fork. Such bushings have a principal function of holding the internal ring in translation along the axis. The axial position of the internal ring is determined and invariable if it is pushed against the internal face of a fork lug or against the spacer which is itself pushed against the fork lug.

The invention is characterized by specific assembly means allowing blocking in rotation, which consist of a pair of planar facets opposing one another, one thereof being made at the bottom of an indentation of one of the lugs of the fork. The other facet is made, according to the embodiments, on a head of the rod, on one of the bushings, or on a circular collar positioned at one polar end of the lower ring, to hold one or other of these parts in rotation. One significant advantage of these pairs of facets is the volume which is saved, since no additional part is required and this arrangement involves nesting of the existing parts, with no protuberance relative to the designs where it does not exist. It is also reliable and durable.

Further assembly means, intended to block the rotational movements, comprise matching lugs and steps joining the internal ring to other parts of the assembly, which may be the aforementioned bushings or even the bushing when there is only one, and a head of the rod. As the rod is held in rotation by the tight fit and at least one of the bushings is held in rotation by a further means such as a second tight fit, the internal ring is thus also held in rotation. A considerable number of means for blocking in translation and in rotation is thus necessary to retain the parts of the assembly and obtain the desired stability during installation.

Other assembly means are to be envisaged, amongst which crimping may be cited, carried out between adjacent parts by folding a deformable portion of one of these parts onto the other. The crimping may be carried out with sufficient force to produce both means for blocking in translation and blocking in rotation. Said means are more reliably guaranteed if the crimping only relates to deformable angular portions, which are folded back into the angular slots of the adjacent part. Examples of crimping may be carried out by folding back a collar at one end of the rod onto the bushing, tabs of the bushing into the slots of the rod, or a collar at one end of the rod onto one of the lugs of the fork.

Certain arrangements of the assembly make it possible to reduce further the lateral spatial requirement by limiting the lengths projecting beyond the fork which remain after the elimination of the screw and nut system. It is in this manner that when the rod comprises a head, it may be housed in an indentation on the external face, or comprise a truncated shape being forced into a conical recess of the lug of the fork. In other designs, the rod comprises a head and one of the fork lugs comprises a recess into which the head is partially forced, instead of abutting against the lug of the fork. It is thus a different means from the head of the rod which define the position for blocking the assembly in translation.

If the rod is forced completely into the bore of the fork lug, the assembly is thus completely incorporated within the fork and the greatest saving in space is obtained.

A particularly simple embodiment is characterized in that the internal ring is retained between a head of the rod and either one of the fork lugs, or a spacer located between the internal ring and one of the fork lugs.

The invention further relates to a control system for a variable pitch flow-straightener and an aircraft engine provided with an assembly in accordance with the preceding information. As this system and this engine are not modified, moreover, relative to the known designs, they will not be described in detail here.

BRIEF DESCRIPTION OF THE DRAWINGS

The invention will be understood more clearly by reading the detailed description of embodiments that follow, which are given by way of illustrative example and are not limiting in any sense, by referring to the accompanying drawings, in which.

DETAILED DESCRIPTION OF PARTICULAR EMBODIMENTS

Figure 1:
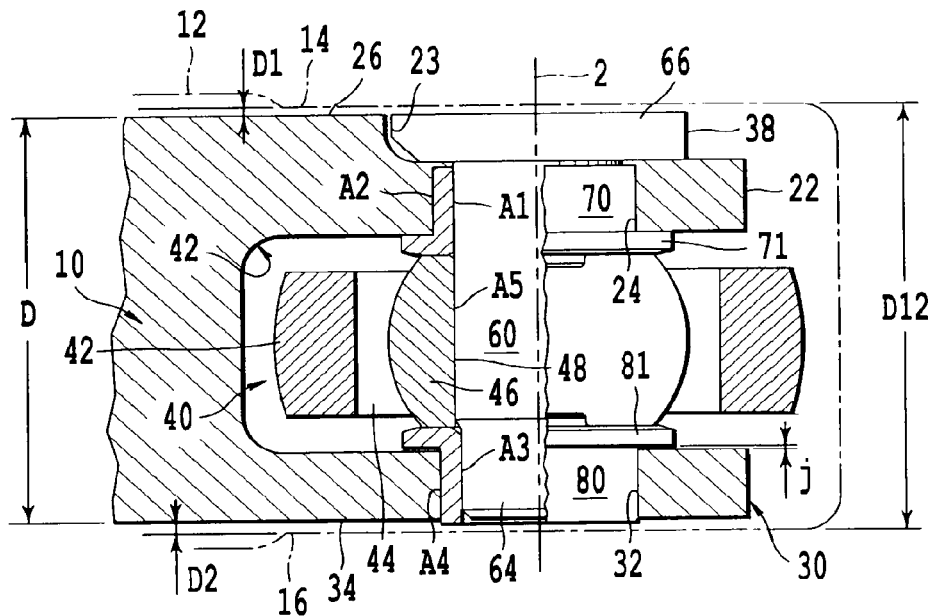
FIG. 1 shows, in section according to a longitudinal plane of symmetry, a first embodiment of the assembly (according to the invention)

Firstly, referring to all the figures, the elements common to all the embodiments of an assembly of a device swiveling on a bell crank fork will be described. In the remainder of the description, and in order to simplify said description, an assembly of a device swiveling on a bell crank fork will be referred to as an "assembly".

The assembly 10 according to the invention is arranged inside a housing 12 (only sketched here) of which the internal dimensions are fixed. In particular, the housing 12 comprises a first internal face 14 and a second internal face 16 arranged opposite one another and parallel to one another, which are separated by a fixed distance D12. The housing 12 is, for example, a housing forming part of a control system for one or more stages of variable pitch flow-straighteners.

The assembly 10 comprises a fork 20 and a swiveling device 40 which are assembled to one another by assembly means. These assembly means comprise an assembly rod 60 and other assembly means which will be defined below.

The fork 20 comprises a first fork lug 22 penetrated by a first lug bore 24 and a second fork lug 30 penetrated by a second lug bore 32. The two lug bores 24, 32 are aligned in the direction of an assembly axis 2.

The fork 20 comprises a first external face 26 which is located opposite the first internal face 14 of the housing 12 at a distance D1 therefrom, and a second external face 34 which is located opposite the second internal face 16 of the housing 12 at a distance D2 therefrom.

The swiveling device 40 comprises, in a manner known per se, a support 42 on which an external ring 44 is fixed, also known as a cage, in which an internal ring 46 is arranged, also known as a ball. The external ring 44 comprises a concave and spherical internal face which cooperates with a convex and spherical face of the internal ring 46 to permit three degrees of freedom in rotation between the external ring 44 and the internal ring 46. The internal ring 46 is penetrated by a ring bore 48.

The assembly rod 60 comprises a substantially cylindrical body. It has a first end 64 and a second end 66.

The fork 20 and the swiveling device 40 are assembled by means of the assembly rod 60 which passes successively through the first lug bore 24, the ring bore 48 and the second lug bore 32 according to the assembly axis 2.

In the examples illustrated in the figures, the assembly rod 60 is dimensioned such that its axial length L (illustrated in FIG. 3) is slightly greater, equal to or less than the distance D (illustrated in FIG. 1) which separates the first external face 26 and the second external face 34. As a result, when the assembly rod 60 is in position in the three bores 24, 48, 32, it is entirely arranged between these two external faces 26, 34. In other words, its first end 62 does not protrude or hardly protrudes beyond the first external face 26 and its second end 64 does not protrude or hardly protrudes beyond the second external face 34.

In addition to the rod 60, the assembly 10 comprises further assembly means, which comprise:
- means for blocking the rod 60 in axial translation according to the assembly axis 2,
- means for blocking in rotation which prevent a rotation of the internal ring 46 relative to the rod 60 about the assembly axis 2.

These other assembly means are entirely arranged between the two external faces 26, 34 of the fork 20. In other words, none of said assembly means project beyond the first external face 26, nor beyond the second external face 34.

It follows from the above that the distance D1 which separates the first external face 26 and the first internal face 14 of the housing 12 may be reduced to a minimum. In a similar manner, the distance D2 which separates the second external face 34 and the second internal face 16 of the housing 12 may be reduced to a minimum. As a result, for a fixed value of the distance D12 between the two internal faces of the housing 12, it is possible to dimension the fork 20 such that the distance D between the two external faces 26, 34 of the fork 20 is very similar to this distance D12.

Now the means for blocking in translation and the means for blocking in rotation belonging to each embodiment of the assembly 10 according to the invention will be described.

FIRST EMBODIMENT

By referring to FIG. 1, a first embodiment of the assembly 10 according to the invention is shown in section according to a longitudinal plane of symmetry.

The first fork lug 22 comprises an indentation 38 on its external face opposite the first internal face 14 of the housing 12. This indentation 38 extends from the free end of the first lug 22, passes through the first lug bore 24, extends beyond the first lug bore over a certain distance, and is interrupted when joining the first external face 26 of the fork 20. This indentation 38 defines, on the exterior of the first lug 22, a substantially planar facet 23 which is perpendicular to the longitudinal plane of symmetry (plane of FIG. 1) of the fork 20 and parallel to the assembly axis 2.

Figure 2:
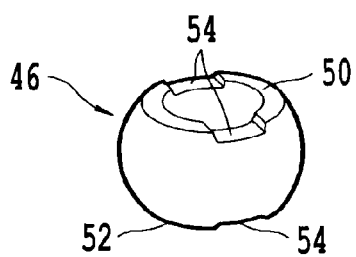
FIG. 2 shows, in perspective, an assembly rod according to the first embodiment.

The internal ring 46 of the swiveling device 40 is shown in perspective in FIG. 2. It has a substantially spherical shape penetrated by a ring bore 48 and cut off at its two poles, defining a first transverse ring face 50 and a second transverse ring face 52 which are perpendicular to the direction of the ring bore 48. Each transverse face 50, 52 carries two diametrically opposed steps 54.

Figure 3:
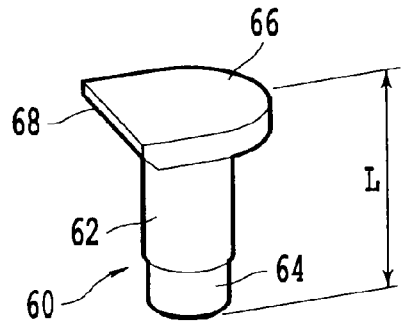
FIG. 3 shows a perspective view of an internal ring of the swiveling device according to the first embodiment.

The assembly rod 60 is shown in perspective in FIG. 3. It carries, at its first end 62, a rod head 66 which has a substantially "D" shape. This rod head 66 has a substantially planar facet 68 parallel to the direction of the assembly rod 60. The second end 64 of the assembly rod 60 has a smaller diameter than that of the remainder of the assembly rod 60.

Figure 4:
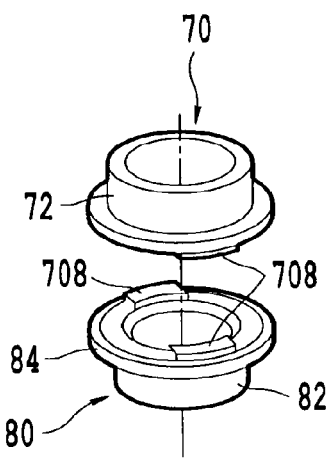
FIG. 4 is a perspective view of the two connecting bushings according to the first embodiment.

The assembly 10 comprises a first connecting bushing 70 and a second connecting bushing 80 which are shown in perspective in FIG. 4. The two connecting bushings 70, 80 are respectively provided with a cylindrical body 72, 82 and a radial end shoulder 74, 84. Each shoulder 74, 84 carries on its face opposing the body 72, 82, two diametrically opposed lugs 708.

The method for installing the assembly 10 will now be described by referring to FIG. 1.

The first connecting bushing 70 is arranged in the first lug bore 24 with its shoulder 74 oriented towards the second lug 30. The second connecting bushing 80 is arranged in the second lug bore 32 with its shoulder 84 oriented towards the first lug 22. The two connecting bushings 70, 80 are oriented about the assembly axis 2 such that their respective lugs 708 are opposite one another.

Then the swiveling device 40 is introduced between the lugs 22, 30 of the fork 20, such that the internal ring 46 is positioned between the two shoulders 74, 84 of the connecting bushings 70, 80 and that the four lugs 708 of the two bushings 70, 80 are located respectively in the four steps 54 of the internal ring 46 and such that the ring bore 48 is aligned with the two lug bores 24, 32.

The assembly rod 60 is then introduced by its second end 64 into the first bushing 70, then into the ring bore 48, then into the second bushing 80 according to the direction of the assembly axis 2, until the head of the rod 66 bears against the indentation 38. The assembly rod 60 is oriented about the assembly axis 2 such that the planar facet 68 of the rod head 66 is parallel with the planar facet 23 of the indentation 38.

The head of the rod 66 and the indentation 38 are dimensioned such that the planar facet 68 of the rod head 66 is in abutment against the planar facet 23 of the indentation 38.

The head of the rod 66 and the indentation 38 are dimensioned such that said rod head 66 does not protrude beyond the first external face 26 of the fork 20.

The assembly rod 60 is dimensioned such that its second end 64 does not protrude beyond the second external face 34 of the fork 20 or protrudes very little.

The two connecting bushings 70, 80 are dimensioned such that the two transverse faces 50, 52 of the internal ring 46 are in abutment against their shoulders 74, 84. The lugs 708 of the bushings 70, 80 and the steps 54 of the internal ring 46 are formed and dimensioned such that the lugs 708 come into engagement in the steps 54 and prevent an axial rotation between the internal ring 46 and each of the two bushings 70, 80.

The two connecting bushings 70, 80 are also dimensioned such that the height of the body 72 of the first connecting bushing 70 is less than or substantially equal to the height of the first lug 22 of the fork 20 in the region of the indentation, such that the rod head 68 may abut against the indentation 38.

The internal diameter of the body 84 of the second connecting bushing 80 is less than the internal diameter of the body 72 of the first connecting bushing 70, in a substantially similar manner to the variation in diameter between the second end of the rod 64 and the first end of the rod 62.

The internal diameter of the first bushing 70 and the part of the rod 60 of greater diameter are dimensioned so as to allow a first close sliding fit A1, for example of the standard type H7g6, between these two parts 60, 70.

The body 72 of the first bushing 70 and the first lug bore 24 of the first lug 22 are dimensioned so as to produce a second tight fit A2, for example of the standard type H7p6, between these two parts 22, 70.

The second end 64 of the assembly rod 60 and the internal diameter of the second connecting bushing 80 are dimensioned so as to produce a third tight fit A3, for example of the standard type H7p6, between these two parts 60, 80.

The body 82 of the second bushing 80 and the second lug bore 32 of the second lug 30 are dimensioned so as to allow a fourth close sliding fit A4, for example of the standard type H7g6, between these two parts 32, 80.

The part of the assembly rod 60 of greater diameter and the ring bore 48 of the internal ring 46 are dimensioned so as to allow a fifth close sliding fit A5, for example of the standard type H7g6, between these two parts 46, 60.

The first embodiment of the assembly 10 comprises means for blocking the assembly rod 60 in translation relative to the fork 20, which are the rod head 66 and the indentation 38 in cooperation.

The first embodiment of the assembly 10 comprises means for blocking in rotation to prevent a rotation of the internal ring 46 relative to the assembly rod 60 about the assembly axis 2.

These means for blocking in rotation comprise first means for blocking in rotation of the internal ring 46 relative to each of the connecting bushings 70, 80, which are the lugs 708 and the steps 54 in cooperation.

These means for blocking in rotation comprise second means for blocking the assembly rod 60 in rotation relative to the second connecting bushing 80, which are the tight fit between these two parts.

These means for blocking in rotation comprise third means for blocking the first connecting bushing 70 in rotation relative to the fork 20, which are the tight fit between the first connecting bushing 70 and the first lug 22.

The first embodiment of the assembly 10 comprises, moreover, the fourth means for blocking the rod 60 in rotation relative to the fork 20 about the assembly axis 2, which are planar facets 68 and 23 in cooperation. These fourth means for blocking in rotation reinforce the third means for blocking in rotation.

As may be seen, and as will be found in the other embodiments of the invention, the fits such as A1 to A5 are a combination of tight fits to introduce the required blocking in rotation and close sliding fits to allow easy installation, but without the risk of allowing an offset of the internal ring 46 and an error in the transmission of the movement.

A fifth sliding fit A5 will be found, in particular, in the other embodiments. The reason is that it should be avoided that the internal ring 46 seizes on the rod 60.

The axial tightening of the system is carried out at the end of the installation by bringing together as closely as possible the second bushing 80 of the rod head 66 and by maintaining said rod head in abutment with the surface of the indentation 38. The second bushing 80 slides into the second lug bore 32 by allowing a final clearance J to be produced, measured in the direction of the axis 2 between the second lug 30 and the flange 81 of the bushing 80. The internal ring 46 ends up being gripped between the flanges 71 and 81 of the bushings 70 and 80 oriented towards one another, the flange 71 of the first bushing 70 abuts against the first lug 22 and the tightening in the third fit A3 retains the system in this position.

It has been mentioned that the second fit A2 was tight. It is possible to select it to be sliding, since the rotations of its first bushing 70 are prevented by the lugs 708, the tightening of the third fit A3 and the abutment between the facets 68 and 222.

FURTHER EMBODIMENTS

In a general manner, the reference numerals of similar elements of different embodiments will carry the same reference numerals of two numbers preceded by 200, 300, etc.

Figure 5:
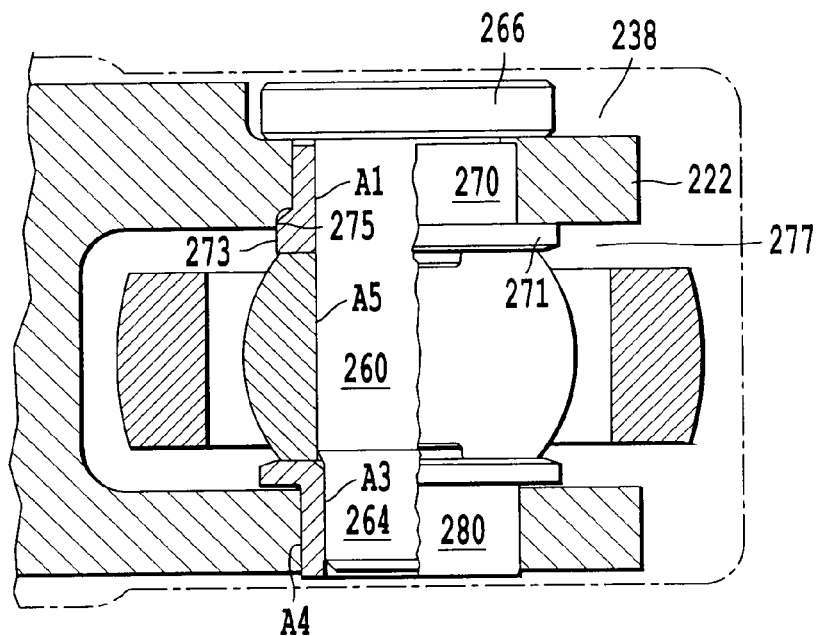
FIG. 5 shows, in section according to a longitudinal plane of symmetry, a second embodiment of the assembly (according to the invention)
Figure 6:
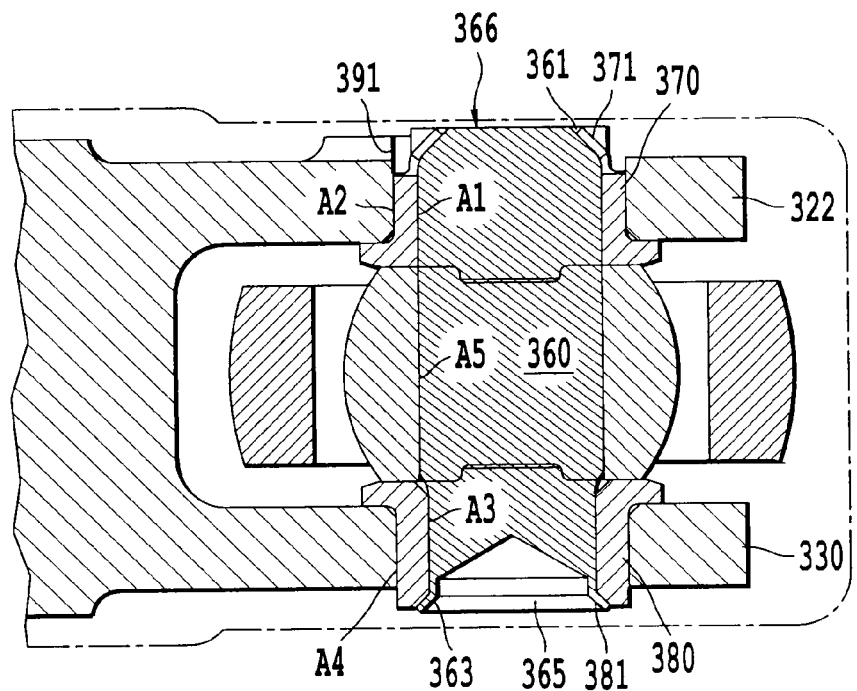
FIG. 6 shows, in section according to a longitudinal plane of symmetry, a third embodiment of the assembly (not according to the invention, per se)
Figure 7:
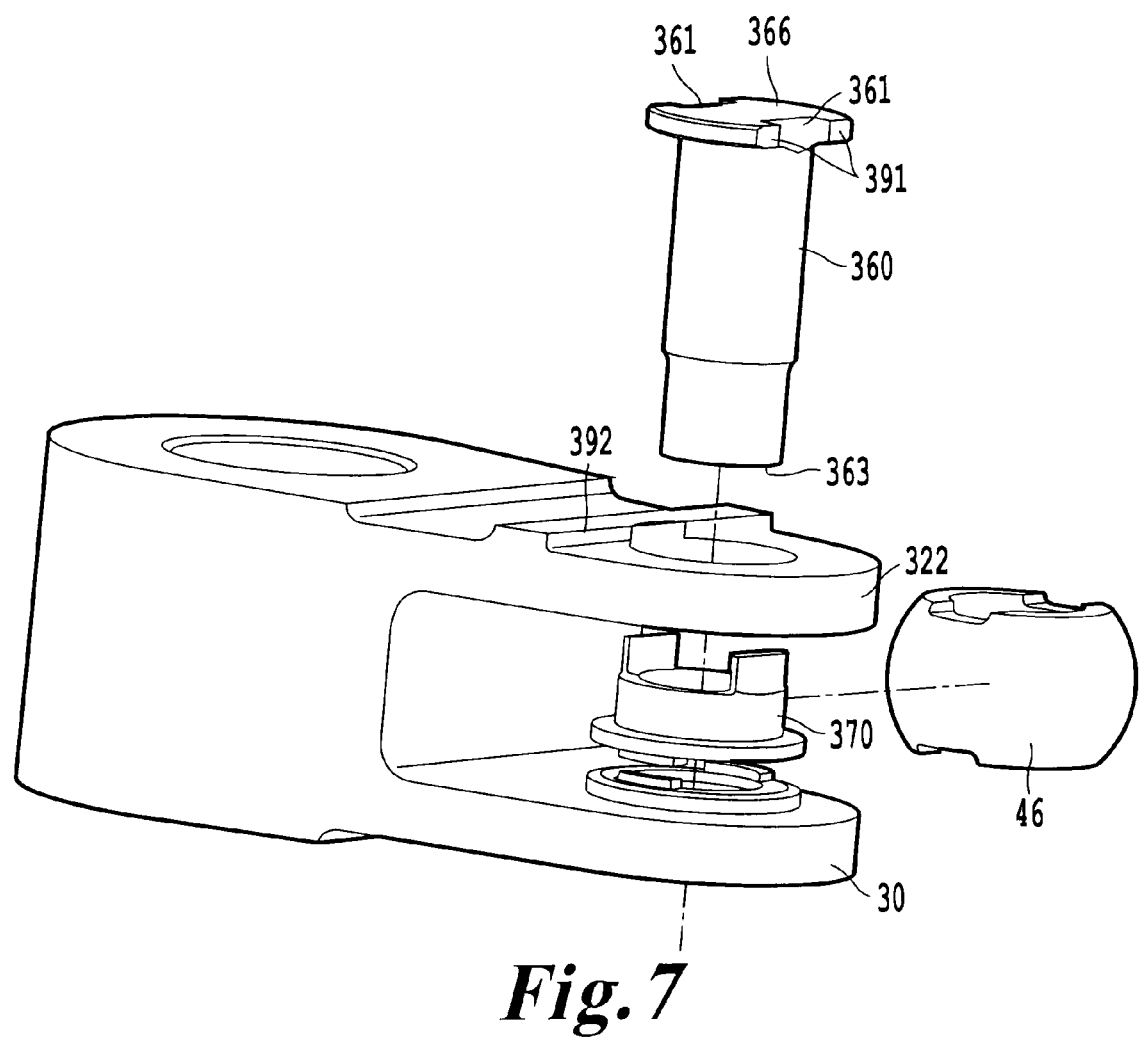
FIG. 7 is an exploded perspective view of the third embodiment of the assembly.
Figure 8:
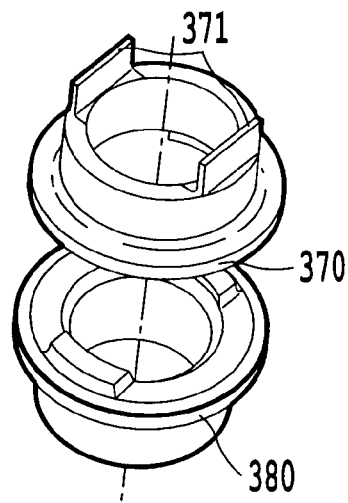
FIG. 8 is a further perspective view showing the two connecting bushings according to the third embodiment.

The second embodiment is disclosed in FIG. 5. It is largely identical to the preceding embodiment such that its complete description is not advantageous and in that only the original elements thereof will be described. The internal ring 246 is thus the same as the preceding one. The rod 260 now comprises a head 266 lacking a planar abutment facet such as at 68 creating a blocking in rotation; it may, however, be perfectly circular. It is the first bushing, referenced by 270, which now carries a similar means, namely a planar facet 273 on a columnar part of the flange 271; this planar facet 273 bears against a planar facet 275 created at the bottom of a second indentation 277 which the first lug 222 now carries, opposing the indentation 238 similar to that already described with the reference numeral 38. The fits A1 to A5 are identical to the preceding one, i.e. the fit A3 between the end (in this case 264) of the rod (in this case 260) and the second bushing (in this case 280) is tight and the others may be sliding, even if it is possible to select tightening for the second fit A2 between the first lug 222 and the first bushing 270 as in the preceding embodiment. The concentricity of the mechanical systems is even better if the second fit A2 is tight.

Figure 9:
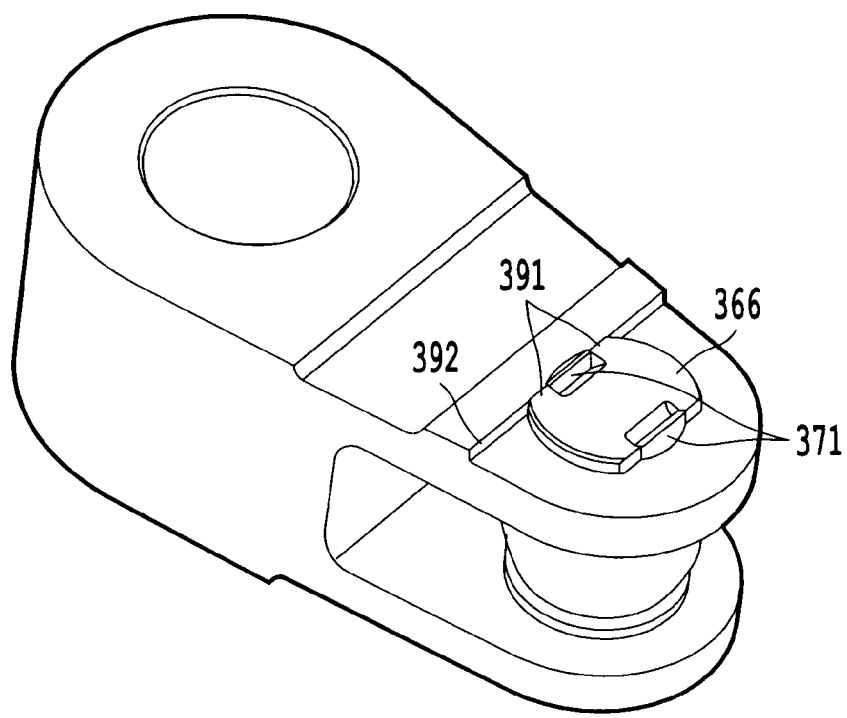
FIG. 9 is a further perspective view of the assembly according to the third embodiment in the configuration prior to the assembly.

The third embodiment shown in FIGS. 6, 7, 8 and 9 involves the use of a rod 360 and the first lug 322 does not need to be indented. The first bushing 370 is provided with tabs 371 which may be deformed on the external side of the first lug 322, projecting in the direction of the axis 2, which may be folded back laterally toward one another onto the beveled slots 361 in the rod head 366, so as to create crimping. In a similar manner, the opposing end of the rod 360 carries a narrowed portion 363 following the shape of a bore 365, being forced in to a certain depth into the rod 360 and this narrowed portion 363 may be folded back onto a bevel 381 made on the internal face of the second bushing 380, on the external side of the second lug 330. This double crimping fixes the rod 360 in rotation and in translation against the bushings 370 and 380. The fit A2 is tight or sliding. The rotations of the assembly of the rod 360, the bushings 370 and 380 and the internal ring 46 are prevented by the engagement of planar faces 391 of the rod head 366 on a dividing wall 392 of the first lug 322 (FIG. 9). The fit A3 is tight to retain the bushing 280 in an identical orientation to that of the bushing 270. The other fits A1, A4 and A5 are sliding as before. In this embodiment, the bushing 370 as well as the ends of the rod 360 have to project slightly outside the lugs 322 and 330 so that a crimping tool reaches them easily. The internal ring 346 is the same as before.

Figure 10:
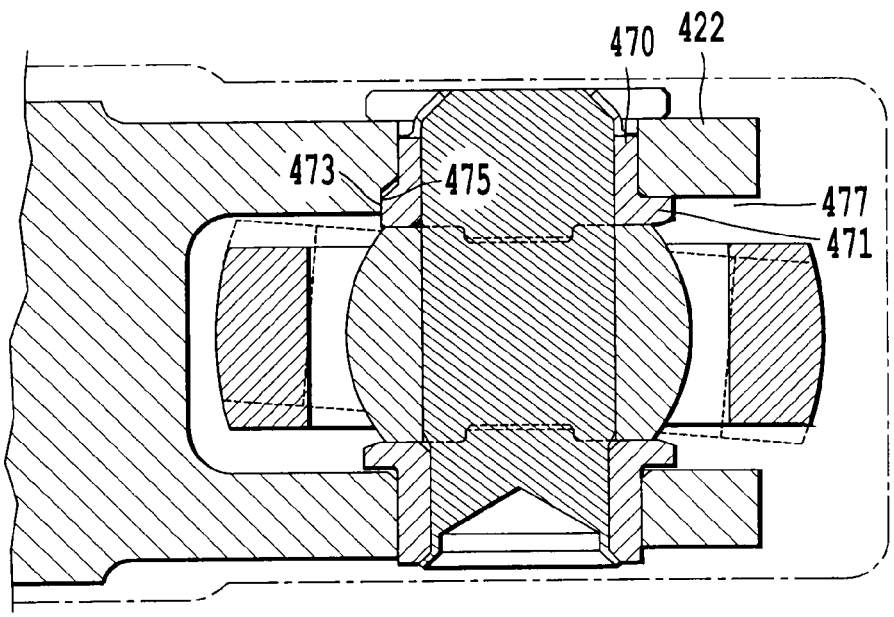
FIG. 10 shows, in section according to a longitudinal plane of symmetry, a fourth embodiment of the assembly (according to the invention)

The fourth embodiment, shown in FIG. 10 combines the characteristics of the two previous embodiments, namely the use of crimping similar to that of the third embodiment and the interaction of a planar end facet 473 made on the flange 471 of the first bushing 470 on a corresponding planar facet 475 at the bottom of an indentation 477 on the internal face of the first lug 422. The fits A2 and A3 are again tight, the three others A1, A4 and A5, sliding.

Figure 11:
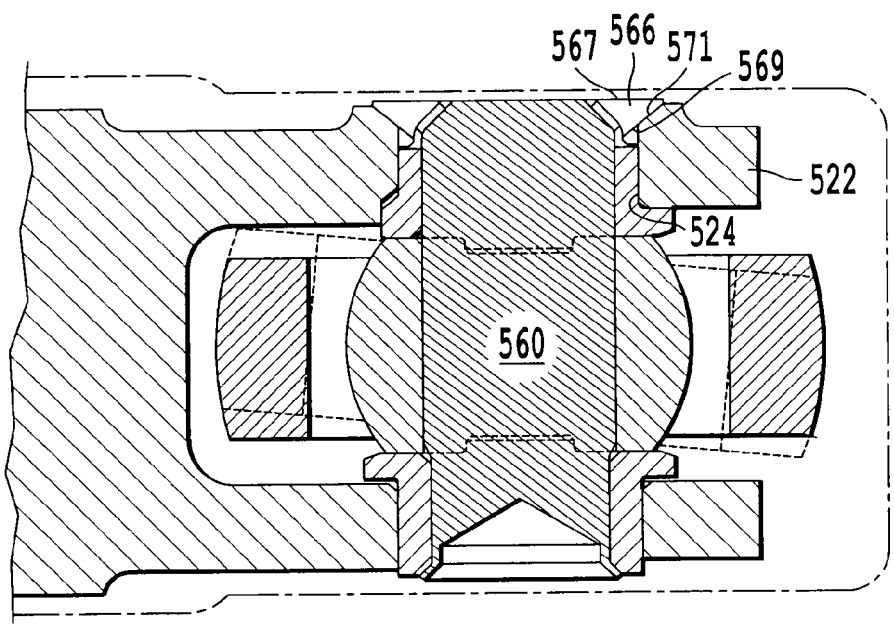
FIG. 11 shows, in section according to a longitudinal plane of symmetry, a fifth embodiment of the assembly (according to the invention)

The fifth embodiment is illustrated in FIG. 11 as a variant of the fourth, but it could be applied to the other preceding embodiments: it is distinguished in that the rod 560 comprises a head 566 which is not planar but truncated, with an upper planar face 567 and a lower face 569 bearing against a bevel 571 made at the external end of the bore 524 of the first lug 522. The fits are the same as before. The advantage of this solution is that the arrangement is more compact since the head 566 hardly projects beyond the first lug 522.

Figure 12:
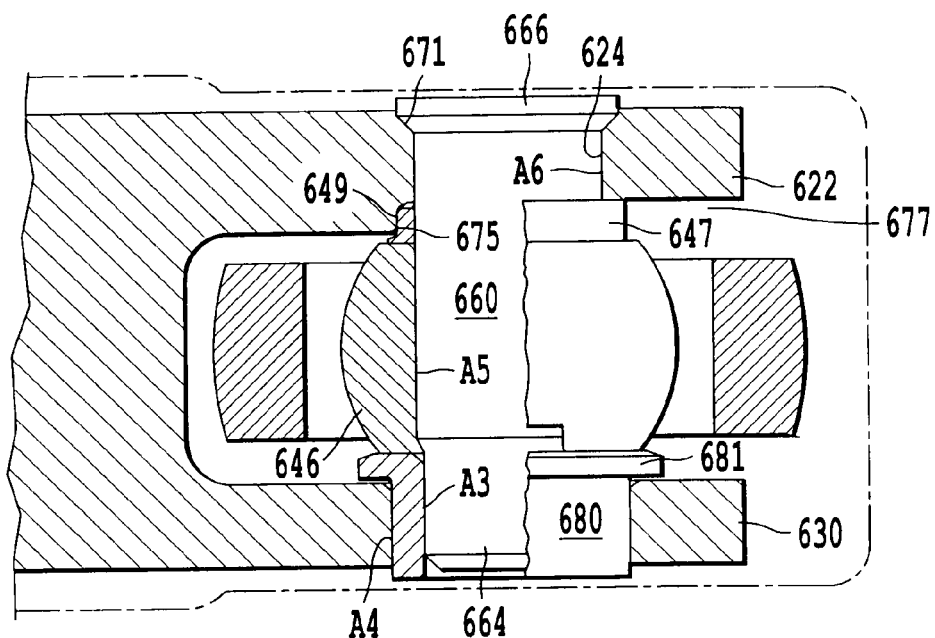
FIG. 12 shows, in section according to a longitudinal plane of symmetry, a sixth embodiment of the assembly (according to the invention)

The following embodiment, the sixth, is illustrated in FIG. 12. The bushing, known as the first bushing in the preceding embodiments and located on the rod head side, no longer exists, and the rod 660 is engaged directly in the bore 624 of the first lug 622. The internal ring 646 is extended to the upper pole by a flange 647 in contact with the internal face of the first lug 622 and which is provided on one part of its periphery with a planar facet 649 which opposes a planar facet made at the bottom of an indentation 677 hollowed out in the first lug 622. This device for blocking in rotation between the fork and the internal ring 646 resembles that which had been used, for example, in the second embodiment between the first bushing 270 and the fork.

The rod 660 comprises a truncated head 666 engaged in a bevel 671 of the first lug 622 in order to touch its surface only slightly and to limit the spatial requirement. Finally the remainder of the device is similar to that of the first embodiment, for example with a bushing 680 similar to the second bushing 80 and one narrow end 664 of the rod 660 enters into this bushing 680.

The fits A1 and A2 of the preceding embodiments are replaced by a fit A6 between the rod 660 and the bore 624 of the first lug 622. The fit A3 remains tight, the others A4, A5 and A6 are sliding. The rotation of the elements of the system is prevented by the abutment between the planar faces 649 and 675, by the lugs between the internal ring 646 and the bushing 680 (they are similar to those of the first embodiment), by the tightening of the fit A3, whilst it is ensured that they are maintained in translation by the abutment of the flange 681 of the bushing 680 against the internal ring 646, the abutment of the internal ring 646 against the bottom of the indentation 677 by the flange 647 and the abutment of the head 666 at the bottom of the bevel 671.

Figure 13:
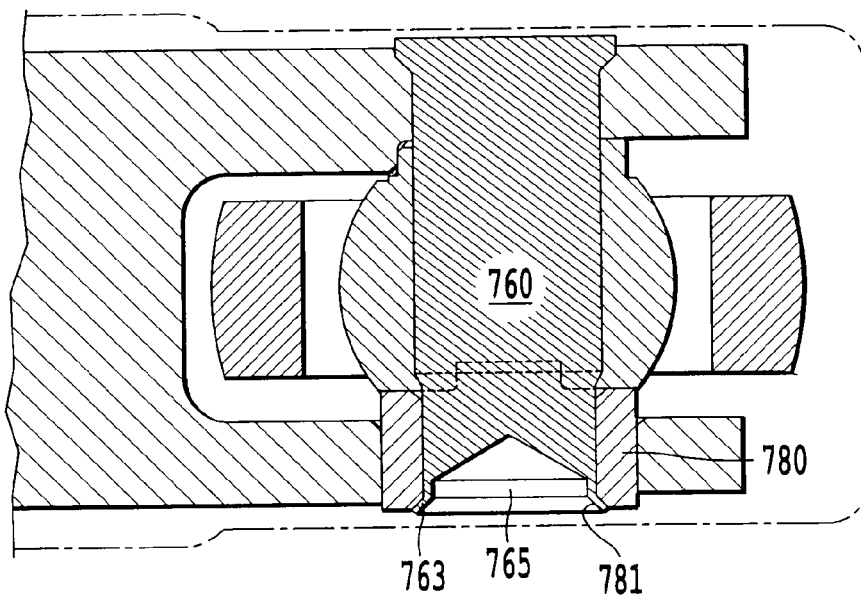
FIG. 13 shows, in section according to a longitudinal plane of symmetry, a seventh embodiment of the assembly (according to the invention)

The seventh embodiment is shown in FIG. 13 and shows a variant of the sixth embodiment, where the bushing 680 with a flange is replaced by a bushing 780 without a flange. The rod 760 comprises a crimping collar 763 at its lower end due to the creation of a bore 765 over a sufficient height. The crimping collar 763 is pushed back onto the bushing 780, which is provided with a lower bevel 781 on its internal face. The crimping and the tight fit between the part 764 of the rod at the location of the bushing 780 and said bushing, in this case further reinforces the connection between the bushing 780 and the rod 760 against movements in rotation or in translation.

Figure 14:
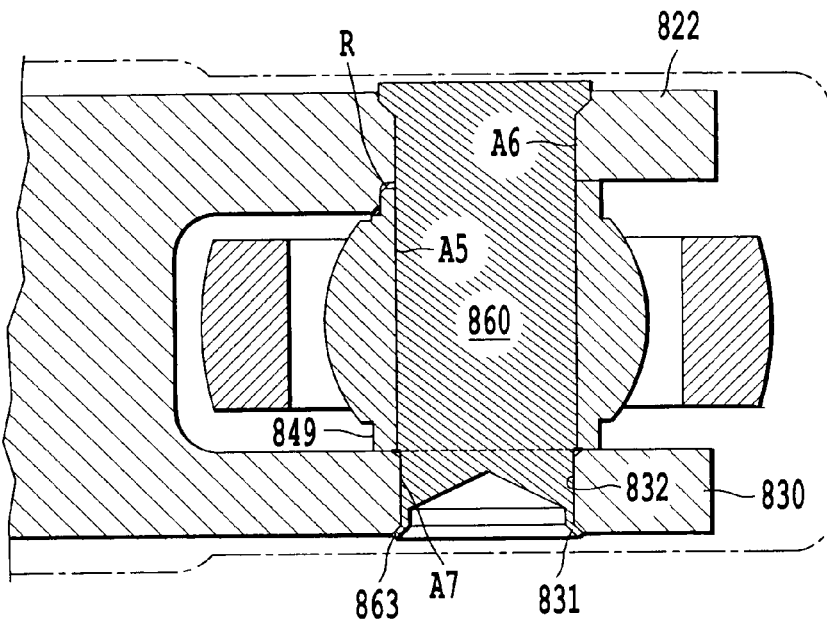
FIG. 14 shows, in section according to a longitudinal plane of symmetry, an eighth embodiment of the assembly (according to the invention)

The eighth embodiment is shown in FIG. 14 and is distinguished from the preceding embodiment in that there is no longer any bushing. The crimping of the rod 860 takes place by pushing back a collar 863 placed in a similar manner to the collar 763 in a bevel 831 at the external end of the bore 832 of the second lug 830. The fits A3 and A4 are replaced by a single tight fit A7 between the rod 860 and the bore 832 of the second lug 830; the fits A5, A6 are both sliding.

Figure 15:
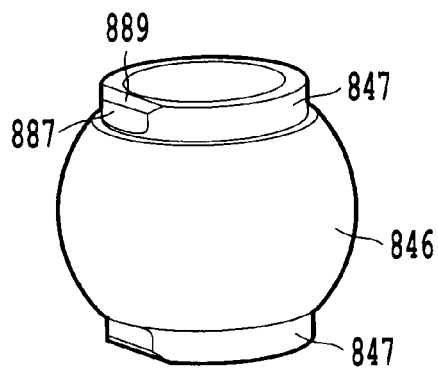
FIGS. 15 to 17 show, respectively, three variants of surfaces for blocking in rotation, which are common to the sixth, seventh, eighth, tenth and fourteenth embodiments.
Figure 16:
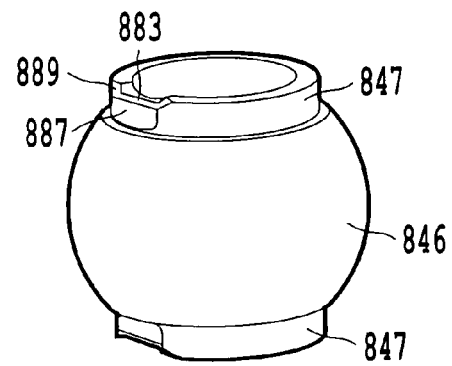
Figure 17:
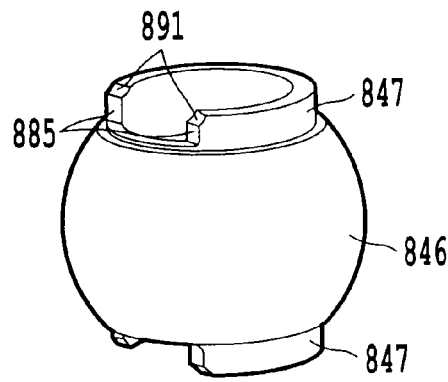

The rod 860 is held in rotation and in translation with a sufficient force between its head and the crimping, and the internal ring 846 now comprises a flange 849 bearing against the internal face of the second lug 830. An arrangement for blocking by a planar facet, similar to that of the sixth and seventh embodiments, blocks the internal ring 846. In this embodiment, it is accepted that the internal ring 846 is retained immediately between the lugs 822 and 830 of the fork. FIGS. 15, 16 and 17 illustrate certain possible shapes of the internal ring 846, which might be also given to the internal rings 646 and 746 of the sixth and seventh embodiments.

All the flanges 847 at the poles of the sphere have these shapes, where said sphere is truncated, and indentations on these flanges 847. These indentations are used to form the planar facet for blocking in rotation. One of the two flanges 847 has to be indented but it is not difficult to indent the two flanges to provide an additional possibility for installation and this is what has been illustrated here.

In FIG. 15, a planar facet 887 is machined on one part of the circumference of the flange 847 and a bevel 889 is added to the junction of the planar facet 887 and the upper face of the flange 847 to eliminate a sharp edge and to avoid the connecting radius R made in the bottom of the bevel of the first bushing 822 (it is illustrated in FIG. 14). In FIG. 16, a machining of the upper face of the flange 847 has been added to form at that point an upper step 883; this design is advisable when the existing thickness of the flange 847 is too small near the bevel 889 in the embodiment of FIG. 15. Finally, FIG. 17 shows a situation which is obtained if the flange 847 has a thickness which is too small to be able to apply the preceding embodiments thereto: it is then machined over its entire thickness, opened up, and the planar facet 887 is replaced by a pair of smaller planar facets 885, which are separate and extend in a common plane; as above, bevels 891 are advantageously machined at the junctions of the planar facets 885 and the upper face of the flange 847.

Figure 18:
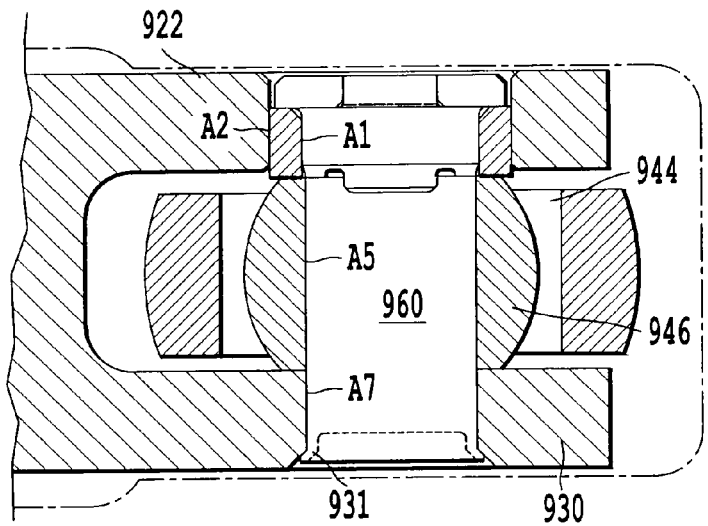
FIG. 18 shows, in section according to a longitudinal plane of symmetry, a ninth embodiment of the assembly (not according to the invention, per se)
Figure 19:
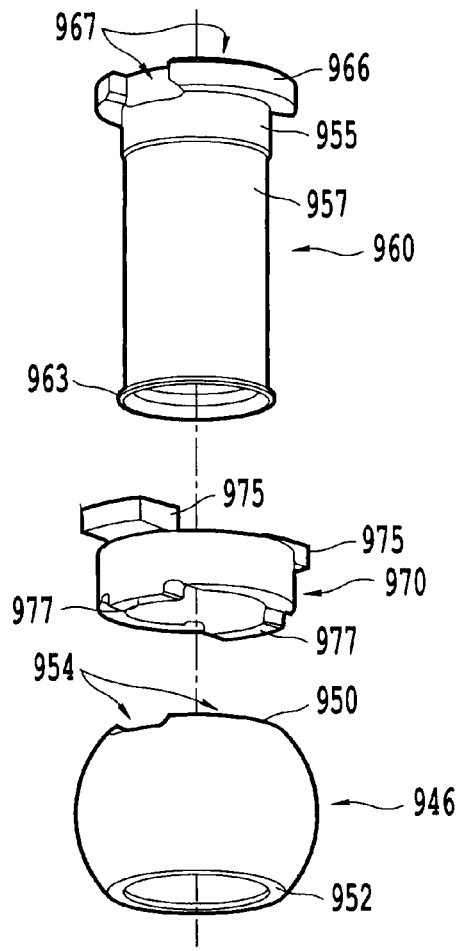
FIG. 19 shows, in an exploded perspective view, the internal ring, a connecting bushing, and the assembly rod, for the ninth embodiment.
Figure 20:
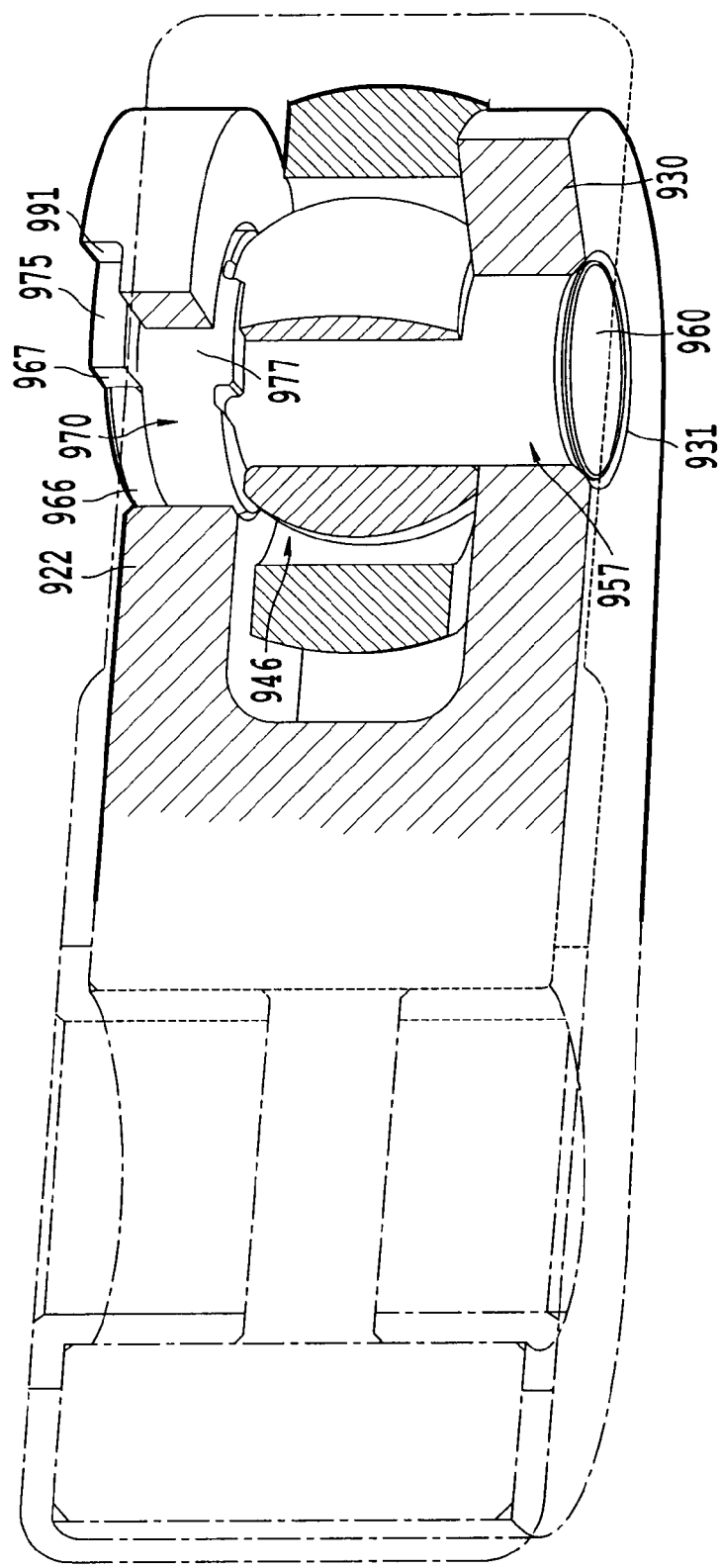
FIG. 20 shows a perspective view of the ninth embodiment.

The ninth embodiment is described in FIGS. 18, 19 and 20. The device principally comprises, apart from the fork, a rod 960, an internal ring 946, an external ring 944 and a bushing 970. The rod 960 comprises a head 966 forced into the bore of the first lug 922 of the fork and touching its surface for a reduced spatial requirement. The rod 960 comprises a collar 963 at its opposing end, to be crimped onto a bevel 931 of the second lug 930. The rod 960 comprises two successive circular bearing surfaces 955 and 957 and respectively resting on the bores of the bushing 970 of the internal ring 946 and of the second lug 930. The bushing 970 is also engaged in the bore of the first lug 922. The fits present on the bearing surfaces 955 and 957 as well as between the bushing 970 and the first lug 922 are denoted A1, A2, A5 and A7 in accordance with the various preceding embodiments. The fit A1 is tight and the fits A2, A5 and A7 are sliding. The internal ring comprises two circular planar end surfaces 950 and 952 respectively bearing against the bushing 970 and against the internal face of the second internal lug 930. As the bushing 970 abuts against the head 966, the system is perfectly blocked in translation and maintained in position by the crimping.

The blocking in rotation of the internal ring 946 and other elements of the system is ensured by the fit A1 and also by lugs 975 and 977 on the two opposing end faces of the bushing 970, which penetrate, for the lugs 977, into recesses 954 associated with the internal ring 946 (FIG. 19) and, for the lugs 975, into recesses 967 associated with the rod head 966 by means of their internal portion (FIG. 19) and into grooves 991 associated with the first lug 922 by means of their external portion (FIG. 20).

Figure 21:
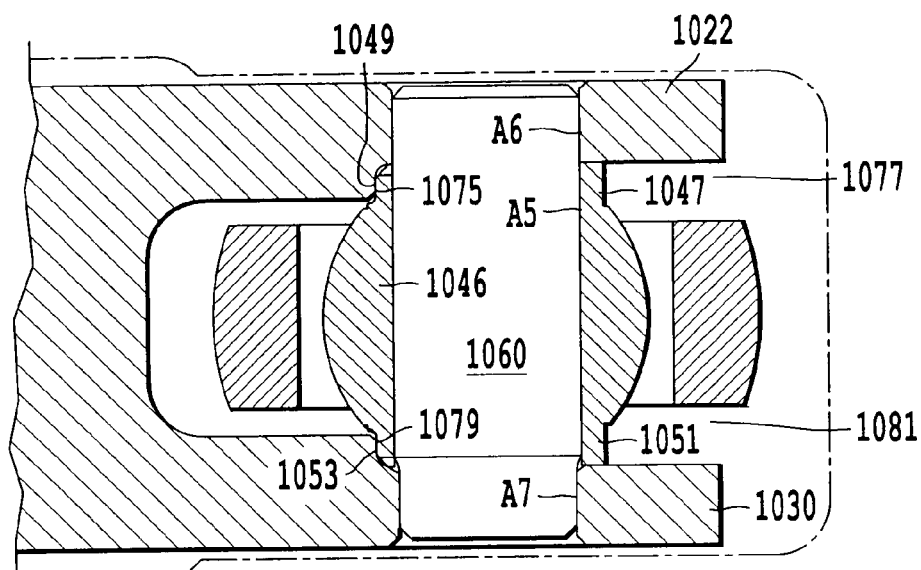
FIG. 21 shows, in section according to a longitudinal plane of symmetry, a tenth embodiment of the assembly (according to the invention)

The tenth embodiment illustrated in FIG. 21 is different and comprises a rod 1060, which is substantially smooth, without a head, and no bushing. The internal ring 1046 is a ball, known as a ball with large clearance from the external ring, which comprises opposing flanges 1047, 1051 provided with planar peripheral facets 1049 and 1053 which bear against corresponding planar facets 675 and 679 at the bottom of indentations 1077 and 1081 made on the internal faces of the lugs 1022 and 1030. The fits A5, A6 and A7 are similar to others already encountered between the rod 1060, the bores of the lugs 1022 and 1030 and the internal ring 1046. The fit A7 between one distal end of the rod 1060 and the second lug 1030 is tight, the two others are sliding. The rod 1060 is maintained in the second lug 1030, and the internal ring 1046 is held in translation between the two lugs 1022 and 1030, on the internal faces of which it bears by a close sliding fit. The rotation of the internal ring 1046 is blocked by the contact of the planar facets 1049 and 1053.

Figure 22:
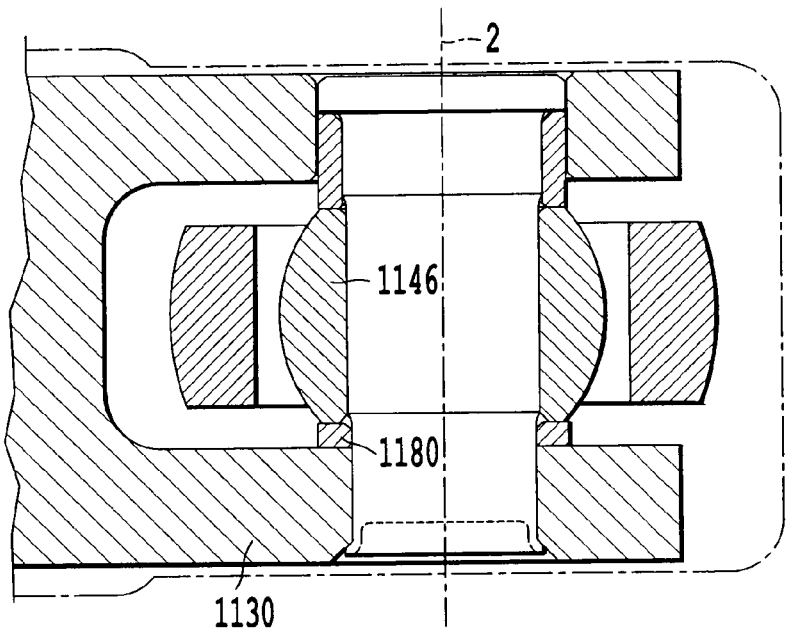
FIG. 22 shows, in section according to a longitudinal plane of symmetry, an eleventh embodiment of the assembly (not according to the invention, per se)

The eleventh embodiment will be described by referring to FIG. 22. It is similar to the ninth embodiment, with, amongst others, a bushing 1170 gripped in the bore of the fork lugs between a rod head 1166 forced completely into this bore and the internal ring 1146, apart from the fact that a ring 1180 is introduced around the rod and retained between the internal ring 1146 and the second lug 1130 of the fork. The fits and their characteristics are identical. The ring 1180 is used as a spacer to obtain a position for the internal ring 1146 which is more centered in the fork in the direction of the axis 2.

Figure 23:
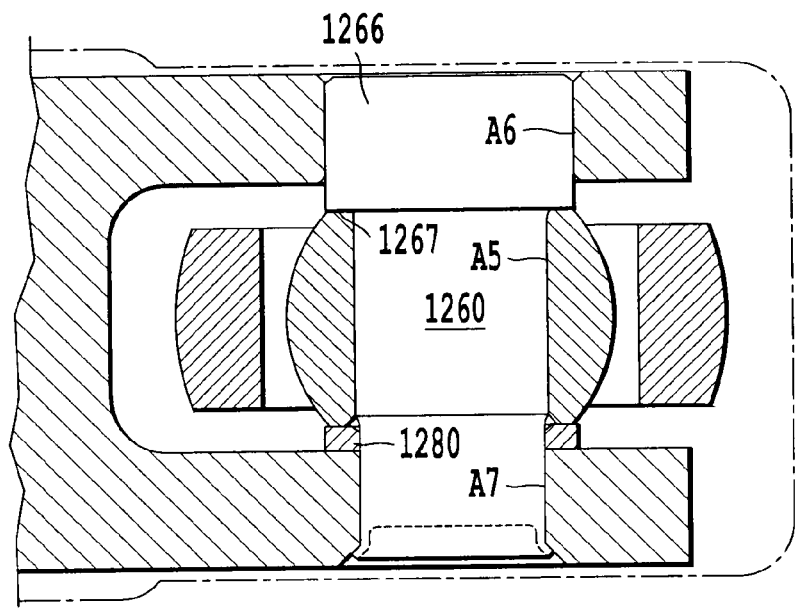
FIG. 23 shows, in section according to a longitudinal plane of symmetry, a twelfth embodiment of the assembly (not according to the invention, per se)

The twelfth embodiment is described by means of FIG. 23. It differs from the previous embodiment in that the bushing is absent and replaced by a solid head 1266 of the rod 1260, which is provided with a planar surface 1267 at right angles to the bearing axis 2 of a polar planar face of the internal ring 1246. Similar fits are found to those already encountered with the reference numerals A5, A6 and A7 and in which the fit A7 between the rod 1260 and the bore of the opposing lug at the rod head 1266 is tight, the others are sliding. The rotation may be blocked simply by ensuring a compression of the internal ring 1246 against the rod 1266 and the spacer ring 1280 (similar to the preceding ring 1180) and by maintaining the whole in position by the crimping of the end of the rod 1266.

Figure 24:
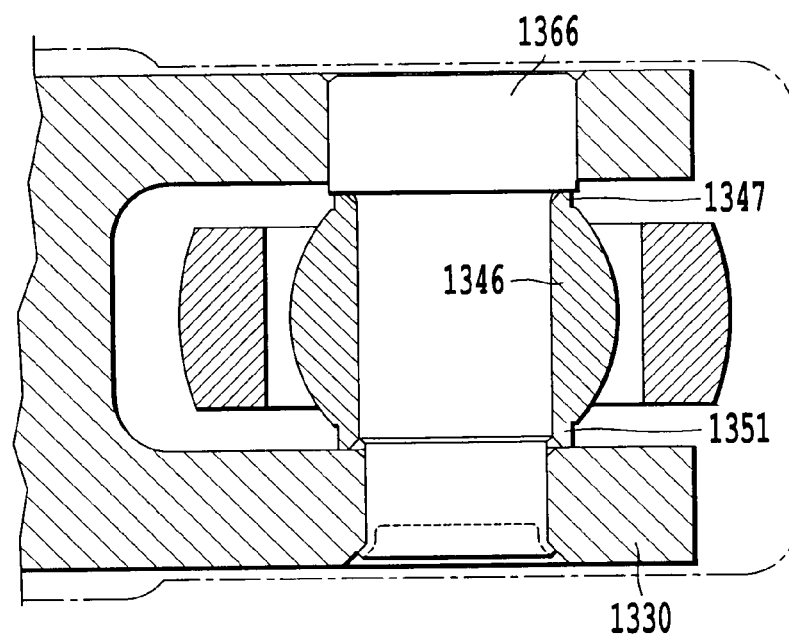
FIG. 24 shows, in section according to a longitudinal plane of symmetry, a thirteenth embodiment of the assembly (not according to the invention, per se)

A thirteenth embodiment will be described by means of FIG. 24. The spacer ring is omitted and the internal ring 1346 is in this case provided with two opposing flanges 1347 and 1351 to ensure the bearing against the rod head 1366 and the second lug 1330 of the fork. Similar fits to the preceding fits exist.

Figure 25:
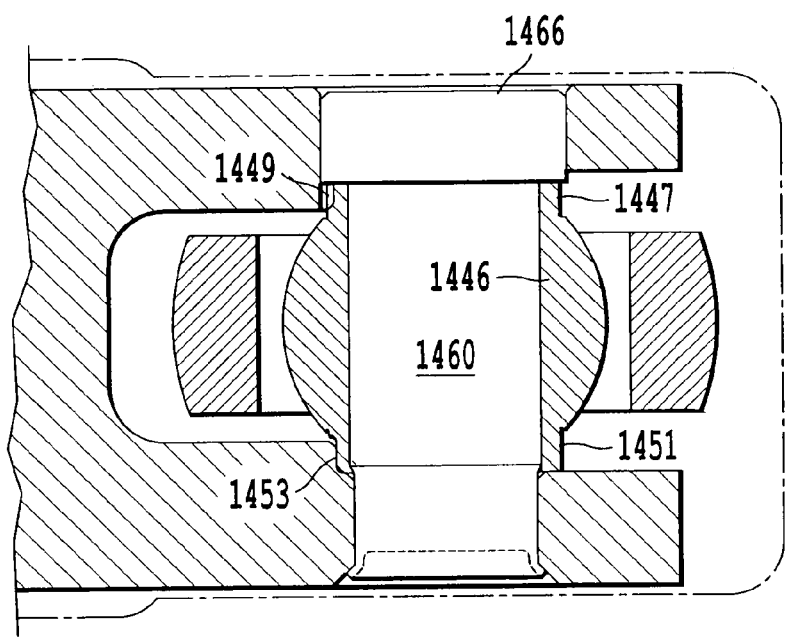
FIG. 25 shows, in section according to a longitudinal plane of symmetry, a fourteenth embodiment of the assembly (according to the invention)

A fourteenth embodiment is described by means of FIG. 25. The arrangement of the internal ring 1466 resembles that of FIG. 21 with, at its polar ends, a pair of flanges 1447 and 1451 each provided with a planar facet 1449 or 1453, blocked in rotation against a corresponding planar facet at the bottom of an indentation of the adjacent fork lug. The flanges 1647 and 1451 abut respectively against the head 1466 and the second fork lug 1430. The rod 1460 is, however, different and instead is reminiscent of that of FIG. 23 with a solid rod head 1466 bearing against one end of the flange 1447 and a collar to be crimped onto a bevel of the fork lug opposing the rod head 1466. This arrangement makes it possible to avoid maintaining the internal ring 1246 between the two fork lugs. The fits are similar to those in FIG. 23. The blocking in translation and in rotation are ensured by the tightness of the fit at the end of the rod 1460, by the crimping and by the planar facets.

Figure 26:
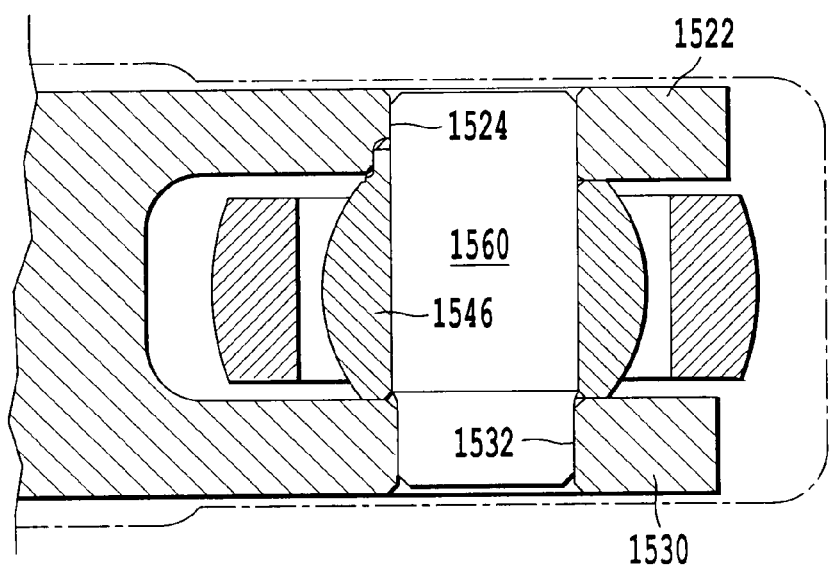
FIG. 26 shows, in section according to a longitudinal plane of symmetry, a fifteenth embodiment of the assembly (not according to the invention, per se).

A fifteenth embodiment will be described in connection with FIG. 26. It corresponds to a particularly simple design, with a rod 1560 without a head, engaged directly in the bores 1524 and 1532 of the lugs 1522 and 1530 and where the internal ring 1546 is retained axially between the internal faces of the two lugs, by bearing thereagainst by means of smooth surfaces, i.e. deprived of flanges or lugs. A standard internal ring is shown as in the other embodiments and in particular the tenth; an internal ring with lateral flanges, known as a ball with large clearance, could be used. As in embodiments of this type where the internal ring is fitted directly between the two lugs, as in the eighth embodiment, the fit of the internal ring 1546 on the rod 1560 is marginally sliding and the internal ring 1546 is retained axially by a close fit, as H7g6 or H7h6 between the lugs 1522 and 1530 of the forks. The rod 1560 is retained in one of the bores 1532, for example, of the fork lug by a tight fit which holds it in place. In such designs, the rod 1560 may be entirely contained within the fork, without touching the surface of the lugs, which constitutes an advantage which is able to compensate for the uncertainty of providing sufficient retention of the internal ring 1546. Such a system is, moreover, very simple to produce.

In all the embodiments from the ninth embodiment, the rod is entirely contained within the two fork lug bores. The mountings are the least space-consuming. That said, in all the examples of the figures, the rod may be entirely contained within the space taken up by the fork lugs, on condition that a slightly greater spatial requirement for the crank forks is tolerated.

All the embodiments of the assembly which have been described here may be provided, for example by combining them together.

The invention claimed is:
1. An assembly comprising:
    a bell crank fork including opposing first and second external faces, and first and second lugs, each of the first and second lugs including a lug bore, the lug bore of the first lug being aligned with the lug bore of the second lug along an assembly axis;

wherein the first lug includes an indentation on an external face of the first lug, the indentation extending from a free end of the first lug a predetermined distance beyond the lug bore of the first lug and forming a substantially planar facet with the first external face of the bell crank fork, the substantially planar facet being perpendicular to a longitudinal plane of symmetry of the bell crank fork and parallel to the assembly axis;

a swiveling device which swivels on the bell crank fork about the assembly axis, said swiveling device including an internal ring having a ring bore and an external ring rotatably disposed on the internal ring, the internal ring including a first transverse ring face and a second transverse ring face which are perpendicular to an axis of the ring bore along the assembly axis, each of the first transverse ring face and the second transverse ring face including diametrically opposed steps recessed into the respective transverse ring face;

an assembly rod which is unthreaded, the assembly rod including a rod head which includes a substantially planar facet which is parallel to a longitudinal direction of the assembly rod along the assembly axis, a first shaft portion of the assembly rod being disposed closer to the rod head than a second shaft portion of the assembly rod;

a first bushing disposed in the lug bore of the first lug, a body of the first bushing being press fit in the lug bore of the first lug to prevent rotation of the first bushing relative to the bell crank fork; and a second bushing disposed in the lug bore of the second lug;

wherein each of the first and second bushings includes a shoulder with an end face which bears against the internal ring and an opposing face, opposite the shoulder, which bears against the first lug and the second lug, respectively;

wherein each of the first and second bushings includes diametrically opposed lugs which protrude from the end face of the shoulder, each of the bushing lugs being matingly engaged with a respective one of the steps of the internal ring to prevent rotation of the internal ring relative to the first and second bushings;

wherein said assembly rod passes successively through the lug bore of the first fork lug, the ring bore, and the lug bore of the second fork lug such that the planar facet of the rod head is parallel with and abuts the planar facet of the indentation in the first fork lug to prevent translation and rotation of the assembly rod relative to the bell crank fork about the assembly axis; and wherein the second shaft portion of the assembly rod is press fit in an internal diameter of the second bushing to prevent rotation of the assembly rod relative to the second bushing.

2. The assembly as claimed in claim 1, wherein the external ring includes a concave and spherical internal face, and the internal ring includes a convex and spherical face which rotates within the concave and spherical internal face.

3. The assembly as claimed in claim 1, further comprising a clearance fit between an inner diameter of the first bushing and the diameter of the first shaft portion of the assembly rod.

4. The assembly as claimed in claim 1, further comprising a clearance fit between a body of the second bushing and the lug bore of the second fork lug.

5. The assembly as claimed in claim 1, further comprising a clearance fit between the first shaft portion of the assembly rod and the ring bore of the internal ring.

6. The assembly as claimed in claim 1, wherein the rod head does not axially extend beyond the first external face of the bell crank fork.

7. The assembly as claimed in claim 1, wherein a diameter of the second shaft portion of the assembly rod is smaller than a diameter of the first shaft portion of the assembly rod.

8. The assembly as claimed in claim 1, wherein the internal diameter of the second bushing is smaller than an internal diameter of the first bushing.

* * * * *